Patented Aug. 31, 1943

2,328,425

UNITED STATES PATENT OFFICE 2,328,425

UREA-TRIAZINE RESIN

Gaetano F. D'Alelio, Pittsfield, Mass., assignor to General Electric Company, a corporation of New York No Drawing. Application December 23, 1940, Serial No. 371,394

17 Claims. (Cl. 260—42)

This invention relates to the production of new and useful synthetic compositions. More particularly the invention is concerned with novel synthetic resins obtained by reaction of a preformed poly-(N-carbinol) derivative of "a urea," e. g., preformed dimethylol urea and thiourea, preformed dimethylol derivatives of substituted ureas and thioureas, etc., and a preformed mono- or poly-(N-carbinol) derivative of "an aminotriazine," e. g., mono-, di-, tri-, tetra-, penta- and hexa-methylol melamines.

By the term "an aminotriazine" as used generally herein is meant a triazine containing either at least one unsubstituted amidogen group or a plurality of partly substituted amidogen groups. (As shown by its dictionary definition, "amidogen" means the radical —NH₂ which is known only in combination in amides and amines.) Of course the aminotriazine of which an N-carbinol derivative thereof is used in carrying the present invention into effect may contain one or more unsubstituted amidogen groups and, also, one or more partly substituted amidogen groups. The only requisite of the aminotriazine prior to the formation of the N-carbinol derivative is that it contain at least two active hydrogen atoms in one or more amidogen groups. These hydrogen atoms may be present either in the form of one or more —NH₂ groups or in the form of two or more —NHR groups, where R represents a monovalent substituent.

By the term "a urea" as used generally herein is meant not only urea itself but also substituted ureas and their equivalents containing at least two active hydrogen atoms, more particularly compounds containing at least one hydrogen atom attached directly to each amide nitrogen.

A preformed N-carbinol derivative of an aminotriazine may be described more definitely as an aminotriazine containing at least one N-carbinol group; and a preformed poly-(N-carbinol) derivative of a urea, as a urea containing at least two N-carbinol groups. An N-carbinol grouping may be described more specifically as a grouping containing the essential unit

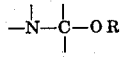

where R represents hydrogen or a monovalent organic radical, more particularly a substituted or unsubstituted hydrocarbon radical.

It has been known heretofore that resinous materials can be prepared by effecting reaction between an aminotriazine and an aldehyde, e. g., formaldehyde, and it also has been suggested that such reaction may be carried out in the presence of other aldehyde-reactable compounds, e. g., urea. However, to the best of my knowledge and belief, a preformed N-carbinol derivative of an aminotriazine never has been used heretofore as a reactant with other preformed N-carbinol compounds in the production of resinous compositions. The suggestion also has been made heretofore that resinous materials might be produced by appropriate heat treatment of preformed mono- or di-methylol ureas, but to the best of my knowledge and belief no resins produced by mere heat treatment of such preformed ureas have had the properties necessary to render them of any commercial value.

The present invention is based on my discovery that resinous products having particularly valuable properties can be produced by effecting reaction between a preformed N-carbinol derivative of an aminotriazine, preferably a preformed poly-(N-carbinol) derivative of an aminotriazine, and a preformed poly-(N-carbinol) derivative of a urea. The reaction may be carried out under acid, neutral or alkaline conditions, at normal or at elevated temperatures, and at atmospheric, sub-atmospheric or super-atmospheric pressure. These new materials are characterized by their high resistance to water as compared with the ordinary resinous condensation products of an aminotriazine, a urea and an aldehyde, more particularly a melamine-urea-formaldehyde resin. Furthermore, the potentially reactive resinous syrups and molding compounds prepared therefrom have excellent time- or storage-stability, that is, they can be stored for long periods of time without materially advancing toward the insoluble, infusible state. This is a matter of considerable practical importance, since the resin or compound then does not need to be used immediately or very soon after its manufacture nor does it need to be subjected to frequent control tests during storage to determine the extent of any changes that may be taking place in its composition. Another advantage accruing from my invention is that the resins are readily diluted with hydroxy compounds, e. g., water, alcohols, etc., and even in such liquid state can be stored for long periods without the sedimentation or gellation difficulties characteristic of many aminoplasts.

In order that those skilled in the art better may understand how the present invention may be carried into effect, the following illustrative examples thereof are given. All parts are by weight.

EXAMPLE 1

A

|  | Parts | Mols (approximately) |
|---|---|---|
| Trimethylol melamine (preformed) | 216 | 1 |
| Dimethylol urea (preformed) | 120 | 1 | were mixed with 336 parts water and heated under reflux at boiling temperature for 30 minutes to yield a clear resinous syrup having a pH of 7.62. Intercondensation with a chlorinated acetamide, e. g., mono-, di- or tri-chloracetamide, causes the potentially reactive (heat-convertible) resinous syrup rapidly to convert to an insoluble, infusible state when subjected to an elevated temperature, e. g., 100° to 200° C.

To 230 parts of the trimethylol melamine-dimethylol urea syrupy resinous reaction product was added 1 part of a curing reactant, specifically chloracetamide. The resulting hot resinous syrup was mixed with 70 parts alpha cellulose in flock form and 0.4 part of a mold lubricant, specifically zinc stearate, to form a molding compound. The wet compound was heated at 68° C. to dry the material and simultaneously therewith to cause the chloracetamide to intercondense with the potentially reactive resinous syrup. The dried compound was molded at 130° C. under a pressure of 2,000 pounds per square inch, yielding an excellently cured molded article that showed good flow characteristics during molding. On an accelerated test to determine its relative resistance to water, it showed 3.78% water absorption. (The water absorption is determined by immersing a weighed sample of the molded article for 15 minutes in boiling water, immersing immediately in cold water for 5 minutes, after which the sample is wiped dry, weighed immediately and the percentage increase in weight recorded as the per cent water absorbed.)

B

|  | Parts | Mols (approximately) |
|---|---|---|
| Melamine | 252 | 2 |
| Urea | 120 | 2 |
| Aqueous solution of formaldehyde (approx. 37.1% HCHO) | 810 | 10 HCHO | were mixed with 162 parts water and heated under reflux at boiling temperature. After 20 minutes' heating the entire mass gelled in the flask. Heating was discontinued and the material discarded since it obviously could not be used in the production of a molding compound.

It will be noted that the proportions of components in B are such that if part of the formaldehyde combined with the melamine to form trimethylol melamine in situ and if all the remainder of the formaldehyde combined with the urea to form dimethylol urea in situ, the mol ratios of such trimethylol melamine to such dimethylol urea would be the same as in the A part of the example, that is, in the ratio of 1 to 1. In a similar manner the mol ratios of melamine, urea and formaldehyde given in the B parts of Examples 2, 3 and 4 were chosen so that, assuming that trimethylol melamine and dimethylol urea were formed in situ, the mol ratios thereof to each other would be the same as in the A parts of the individual examples.

EXAMPLE 2

A

|  | Parts | Mols (approximately) |
|---|---|---|
| Trimethylol melamine (preformed) | 216 | 1 |
| Dimethylol urea (preformed) | 360 | 3 | were mixed with 576 parts water and heated under reflux at boiling temperature to yield a clear resinous syrup having a pH of 7.20. Molding compounds and molded articles were prepared as described under A of Example 1 with the exception that after adding the chloracetamide to the resin syrup the mixture was heated under reflux at boiling temperature for 5 minutes to effect intercondensation. The molded pieces were excellently cured throughout, had good surface characteristics and good resistance to boiling water. When tested for water resistance a molded sample showed only 3.15% water absorption.

B

|  | Parts | Mols (approximately) |
|---|---|---|
| Melamine | 126 | 1 |
| Urea | 180 | 3 |
| Aqueous solution of formaldehyde (approx. 37.1% HCHO) | 729 | 9 HCHO | were mixed with 128 parts water and heated under reflux at boiling temperature for 30 minutes, yielding a cloudy syrup having a pH of 6.62. On cooling to room temperature the syrup became an opaque gel. A molding compound and a molded article were prepared as described under 1—A, with the exception that the chloracetamide was refluxed with the resin syrup for 5 minutes as in A of this example. The molded article had a water absorption value of 5.29% as compared with only 3.15% for the corresponding A product of this example.

EXAMPLE 3

A

|  | Parts | Mols (approximately) |
|---|---|---|
| Trimethylol melamine (preformed) | 126 | 1 |
| Dimethylol urea (preformed) | 600 | 5 | were mixed with 816 parts water and heated under reflux at boiling temperature for 30 minutes, yielding a clear resinous syrup having a pH of 7.40. This syrup showed no appreciable increase in viscosity on cooling to room temperature or upon prolonged standing at normal temperature conditions. A molding compound and a molded article were prepared as described under A of Example 1, with the exception that the chloracetamide was refluxed with the resinous syrup as stated under 2—A. An excellently cured molded piece that showed good flow characteristics during molding was obtained. The surface appearance also was very good. The molded article did not disintegrate or show any material change in surface appearance when immersed in boiling water for 15 minutes. On an accelerated test to determine its relative resistance to water, it surprisingly showed only 2.21% water absorption.

B

|  | Parts | Mols (approximately) |
|---|---|---|
| Melamine | 126 | 1 |
| Urea | 300 | 5 |
| Aqueous solution of formaldehyde (approx. 37.1% HCHO) | 1,053 | 13 HCHO | were mixed with 156 parts water and the mixture heated under reflux at boiling temperature for 30 minutes, yielding a resinous syrup having a pH of 5.65. Upon cooling to room temperature this syrup became opaque and very viscous. A molded article made from a molding compound prepared as in 1—A, the chloracetamide being intercondensed with the resinous syrup as in 2—A, showed the relatively high water absorption value of 9.69% as compared with only 2.21% for the corresponding A product of this example.

EXAMPLE 4

A

|  | Parts | Mols (approximately) |
|---|---|---|
| Trimethylol melamine (preformed) | 216 | 1 |
| Dimethylol urea (preformed) | 840 | 7 | were mixed with 1060 parts water and the mixture heated under reflux for 30 minutes at boiling temperature, yielding a clear resinous syrup having a pH of 7.13. This syrup remained clear and of low viscosity when cooled to room temperature. A molding compound and a molded article were prepared as in 1—A with the exception that the chloracetamide was intercondensed with the resinous syrup as in 2—A. The molded piece was excellently cured throughout, showed good plastic flow during molding and was exceptionally high in its resistance to water on an accelerated test. Its water absorption value was only 2.10%.

B

|  | Parts | Mols (approximately) |
|---|---|---|
| Melamine | 126 | 1 |
| Urea | 420 | 7 |
| Aqueous solution of formaldehyde (approx. 37.1% HCHO) | 1,377 | 17 HCHO | were mixed with 189 parts water and heated under reflux for 30 minutes at boiling temperature, yielding a resinous syrup having a pH of 5.58. This syrup became opaque and a very viscous mass upon cooling to room temperature. A molding compound and a molded article were prepared from this syrup following the formula and procedure described under 1—A, but intercondensing the chloracetamide with the resin syrup as in A of Example 2. The molded piece appeared to be well cured. However, its water absorption value was relatively high, being 8.07% as compared with only 2.10% for the corresponding product of A of this example.

From a comparison of the results of the A and B portions of the above examples it is clear that if dimethylol urea and trimethylol melamine do form when urea, melamine and formaldehyde are caused to react as described in the B parts of the examples, such dimethylol urea and trimethylol melamine are not the equivalents of the preformed dimethylol urea and preformed trimethylol melamine used as reactants in forming the resins and thermosetting molding compositions described in the A parts of the examples. This will be seen at once from a comparison of the data for water absorption values on the A and B products shown in convenient tabular form in Table 1.

Table 1

| Example | Per cent by weight water absorbed by molded piece |
|---|---|
| 1-A | 3.78 |
| 1-B | (¹) |
| 2-A | 3.15 |
| 2-B | 5.69 |
| 3-A | 2.21 |
| 3-B | 9.69 |
| 4-A | 2.10 |
| 4-B | 8.17 |

¹ Syrup gelled; molded article was not made.

The startling and unpredictable results of this invention are readily discernible from the data shown in Table 1. For instance, when the ratio of urea to melamine in the ordinary urea-melamine-formaldehyde resin is increased, the water resistance of molded pieces made under identical conditions from the individual syrups becomes, in general, poorer. On the other hand, when the ratio of preformed dimethylol urea to preformed trimethylol melamine, in equivalent concentrations, is correspondingly increased, the water resistance becomes greater; that is, the molded article absorbs less water on a water absorption test.

It will be understood, of course, by those skilled in the art that my invention is not limited to the specific components named in the above illustrative examples. Thus, instead of preformed dimethylol urea, other preformed poly-(N-carbinol) derivatives of a urea may be employed.

More specific examples of preformed poly-(N-carbinol), specifically di-(N-carbinol), derivatives of a urea that may be used in producing the new synthetic compositions of this invention are the preformed di-(N-carbinol) derivatives of substituted ureas and their equivalents containing at least two active hydrogen atoms, more particularly compounds containing at least one hydrogen atom attached directly to each amide nitrogen. Thus I may use, for example, preformed di-(N-carbinol), more particularly preformed di-(N-methylol), derivatives of alkyl ureas and thioureas (e. g., methyl, ethyl, etc., ureas and thioureas), aryl ureas and thioureas (e. g., phenyl urea and thiourea, unsymmetrical diphenyl urea and thiourea, etc.), alkyl aryl ureas and thioureas (e. g., unsymmetrical methyl phenyl urea and thiourea, unsymmetrical ethyl phenyl urea and thiourea, etc.), hydroxy ureas and thioureas, ethanol ureas and thioureas, acetyl urea and thiourea, allyl urea and thiourea, 2-chlorallyl urea and thiourea, di-(phenyl sulfonamide) ureas and thioureas, guanyl urea and thiourea, guanidine, biguanide, aminoguanidine, dicyandiamide, etc.

Likewise, instead of preformed trimethylol melamine, the preformed mono- or poly-(N-carbinol) derivatives of other triazines containing either at least one unsubstituted amidogen group or a plurality of partly substituted amidogen groups may be employed. Examples of such triazines, the preformed N-carbinol derivatives of which may be used in producing the new synthetic materials of this invention, are: ammeline, ammelide, formoguanamine, 2-amino-1,3,5-triazine and its substitution products; derivatives of melamine, e. g., 2,4,6-trihydrazino-1,3,5-triazine, melam, melon, 2,4,6-triethyltriamino-1,3,5-triazine, 2,4,6-triphenyltriamino-1,3,5-triazine, etc.; nuclearly substituted aminotriazines, e. g., 1-cyano-2-amino-4,6-dimethyl-1,3,5-triazine, 2-chloro-4,6-diamino-1,3,5-triazine, 6-methyl-2,4-diamino-1,3,5-triazine, 2-alkyl-4-amino-6-hydoxy-1,3,5-triazines (e. g., 2-methyl-4-amino-6-hydroxy-1,3,5-triazine, etc.), 2-aryl-4-amino-6-hydroxy-1,3,5-triazines (e. g., 2-phenyl-4-amino-6-hydroxy-1,3,5-triazine, etc.), 2-phenyl-p-oxy-4,6-diamino-1,3,5-triazine; poly-amino triazines wherein the hydrogen atoms of one or all of the amino groups are partially substituted by other amino groups, e. g., 2,4-diamino-6-hydrazino-1,3,5-triazine, 2-amino-4,6-dihydrazino-1,3,5-triazine, 2,4,6-trihydrazino-1,3,5-triazine, etc.; poly-amino triazines wherein the hydrogen atoms of one or all of the amino groups are partially substituted by other monovalent substitutents (e. g., alkyl, aryl, aralkyl, alkaryl, etc.), for instance 2-amino-4,6-diethylamino-1,3,5-triazine, 4-amino-2,6-diphenylamino-1,3,5-triazine, 2-methylamino-4-amino-6-chloro-1,3,5-triazine, 2,4-diamino-6-phenylamino-1,3,5-triazine, symmetrical trialkyl and triaryl melamines; the amidogen, 1,2,3-triazines and the amidogen 1,2,4-triazines, specifically the carbamyl (—NH$_2$) and the amido (—CONH$_2$) and the thiocarbamyl (—CSNH$_2$) 1,2,3- and 1,2,4-triazines. Additional examples of amidogen 1,3,5-triazines are given below:

2-carbamido-4,6-diamino-1,3,5-triazine
2,4-dicarbamido-6-amino-1,3,5-triazine
2,4,6-tricarbamido-1,3,5-triazine
2-thiocarbamido-4,6-diamino-1,3,5-triazine
2,4-dithiocarbamido-6-amino-1,3,5-triazine
2,4,6-trithiocarbamido-1,3,5-triazine
Carbimido and thiocarbimido derivatives of 1,3,5-triazines corresponding to the above carbamido and thiocarbamido derivatives
2-semicarbazido-4,6-diamino-1,3,5-triazine
2,4-di-(semicarbazido)-6-amino-1,3,5-triazine
2,4,6-tri-(semicarbazido)-1,3,5-triazine
2-(para-benzamide)-4,6-diamino-1,3,5-triazine
2,6-di-(para-benzamide)-4-amino-1,3,5-triazine
2,4,6-tri-(para-benzamide)-1,3,5-triazine
2-(ortho-phenylsulfonamide)-4,6-diamino-1,3,5-triazine
2,4-di-(ortho-phenylsulfonamide)-6-amino-1,3,5-triazine
2,4,6-tri-(ortho-phenylsulfonamide)-1,3,5-triazine
Meta-phenylsulfonamide and para-phenylsulfonamide derivatives of 1,3,5-triazines corresponding to the above ortho-phenylsulfonamide derivatives.

Other examples of amidogen triazines are the amidogen 1,2,3- and 1,2,4-triazines corresponding to the above amidogen 1,3,5-triazines. The preferred class of triazine derivatives used in carrying the present invention into effect are the preformed N-carbinol derivatives of the 2,4,6-amidogen-1,3,5-triazines.

In many cases other compounds, e. g., aminodiazines, aminodiazoles, urea, thiourea, substituted ureas and their equivalents may be substituted for a part of the preformed poly-(N-carbinol) derivative of a urea, or for a part of the mono- or poly-(N-carbinol) derivative of an aminotriazine.

If condensation catalysts are employed to accelerate the condensation reaction between the components, I prefer to use an alkaline or basic condensing agent. Condensation products having excellent storage-stability characteristics can be obtained by causing the condensation reaction to take place in the presence of a condensation catalyst comprising a primary condensation catalyst and a secondary condensation catalyst. As the primary catalyst advantageously may be used a member of the class consisting of nitrogen-containing basic compounds, e. g., ammonia, primary amines (e. g., ethyl amine, propyl amine, etc.), secondary amines (e. g., dipropyl amine, dibutyl amine, etc.) and tertiary amines such as trialkyl (e. g., trimethyl, triethyl, etc.) amines, triaryl (e. g., triphenyl, etc.) amines, etc. The secondary condensation catalyst, which ordinarily is used in an amount less than the amount of the primary catalyst, should be a fixed alkali, for instance a carbonate, cyanide or hydroxide of an alkali metal (e. g., sodium, potassium, lithium, etc.). Thus, resinous products of exceptional storage stability may be obtained by causing the initial condensation reaction to be carried out in the presence of a condensation catalyst comprising a relatively small amount of ammonia and a lesser but substantial amount of a fixed alkali, specifically sodium or potassium hydroxide.

In producing my new compositions of matter comprising a reaction product of ingredients comprising essentially a preformed mono- or poly-(N-carbinol) derivative of an aminotriazine, e. g., preformed trimethylol melamine, and a preformed poly-(N-carbinol) derivative of a urea, e. g., dimethylol urea, the ratio between the components may be considerably varied but, in general, it is desirable to use at least one mol of the latter for each mol of the former. Advantageously I effect reaction between a preformed mono- or poly-(N-carbinol) derivative of an aminotriazine and a preformed poly-(N-carbinol) derivative of a urea in the ratio of one mol of the former to from 1 to 10 mols of the latter, excellent results being obtained with from 2 to 7 mols of the latter for each mol of the former. A preferred method of preparing the new compositions of this invention comprises forming a partial condensation product of ingredients comprising essentially preformed trimethylol melamine and preformed dimethylol urea in the presence of a condensation catalyst comprising ammonia and a fixed alkali, and completing the condensation reaction between the said ingredients in the presence of a curing reactant, specifically a curing reactant comprising chloracetamide.

From the foregoing description it will be seen that the present invention provides new compositions of matter, more particularly new synthetic resinous compositions, comprising the product of reaction of (1) a chlorinated acetamide and (2) a partial condensation product of ingredients comprising essentially (a) a preformed methylol amidogentriazine in which the methylol group is attached directly to the nitrogen of the amidogen group and (b) a preformed compound consisting of a urea containing at least two methylol groups attached directly to the nitrogen of the urea.

The properties of the fundamental resins of this invention may be varied widely by introducing other modifying bodies before, during or after effecting condensation between the primary components. Thus, as modifying agents I may use, for instance, monohydric alcohols such as ethyl, propyl, isopropyl, butyl, amyl, etc., alcohols; polyhydric alcohols such as ethylene glycol, diethylene glycol, glycerine, pentaerythritol, etc.; amides such as formamide, acetamide, stearamide, acrylamide, benzamide, toluene sulfonamide, benzene disulfonamide, benzene trisulfonamide, adipic diamide, phthalamide, etc.; amines such as ethylene diamine, aniline, phenylene diamine, etc.; phenols; aminophenols; ketones; nitriles, e. g., acrylonitrile, methacrylonitrile, succinonitrile, etc.; and others.

The modifying bodies also may take the form of high molecular weight bodies with or without resinous characteristics, for example hydrolyzed wood products, formalized cellulose derivatives, lignin, proteins, protein-aldehyde condensation products, aminodiazine- and aminodiazole-aldehyde condensation products, phenol-aldehyde condensation products, aniline-aldehyde condensation products, furfural condensation products, modified or unmodified, saturated or unsaturated polyhydric alcohol-polybasic acid condensation products, sulfonamide-aldehyde resins, water-soluble cellulose derivatives, natural gums and resins such as shellac, rosin, etc.; polyvinyl compounds such as polyvinyl alcohol, polyvinyl acetate, polyvinyl acetals, specifically polyvinyl formal, etc. The synthetic compositions of this invention also may be used as modifiers of, or may be modified by, the synthetic compositions disclosed and claimed in various copending applications of mine, for example in copending application Serial No. 371,393 and Serial No. 371,395, which applications were filed December 23, 1940, and are assigned to the same assignee as the present invention. More specifically, the compositions of this invention may be used in the form of mixtures with, for example, a condensation product of preformed dimethylol urea and a urea, or a condensation product of preformed dimethylol urea and an aminotriazine, or with both such condensation products.

Dyes, pigments, plasticizers, mold lubricants, opacifiers and various fillers (e. g., wood flour, glass fibers, asbestos, including defibrated asbestos, mineral wool, mica, cloth cuttings, etc.) may be compounded with the resin in accordance with conventional practice to provide molding compositions best fitted to yield molded articles of optimum properties for the particular service application.

The molding compositions of this invention may be molded into a wide variety of shapes under heat or under heat and pressure, more particularly at temperatures of the order of 100° to 200° C. For optimum results I prefer to use temperatures ranging from approximately 120° to 180° C. Molding pressures may be varied considerably, but usually are within the range of 1,000 to 10,000 pounds per square inch, more particularly from 2,000 to 4,000 or 5,000 pounds per square inch.

The modified and unmodified resinous compositions of this invention have a wide variety of uses. For example, in addition to their use in the production of molding compositions, they may be used as laminating varnishes in the production of laminated articles wherein sheet materials, e. g., paper, cloth, sheet asbestos, etc., are coated and impregnated with the resin, superimposed, and thereafter united under heat and pressure. They also may be used in the production of wire or baking enamels, and for baking or cementing together mica flakes to make a laminated mica article. They are particularly useful as fire retardants and sizings for cotton, linen and other cellulosic materials. They also may be used as impregnants for electrical coils. The cured products have excellent resistance to heat and water, and have a high dielectric strength and excellent arc resistance.

What I claim as new and desire to secure by Letters Patent of the United States is:

1. A composition of matter comprising the product of reaction of (1) a chlorinated acetamide and (2) a partial condensation product of ingredients comprising essentially (a) a preformed methylol amidogentriazine in which the methylol group is attached directly to the nitrogen of the amidogen group and (b) a preformed compound consisting of a urea containing at least two methylol groups attached directly to the nitrogen of the urea.

2. A composition comprising the resinous product of reaction of (1) a chlorinated acetamide and (2) a partial condensation product of ingredients comprising essentially (a) a preformed poly-methylol amidogentriazine in which the methylol group is attached directly to the nitrogen of the amidogen group and (b) a preformed compound consisting of a urea containing at least two methylol groupings attached directly to the nitrogen of the urea.

3. A resinous composition comprising the product of reaction of (1) a chlorinated acetamide and (2) a partial condensation product of ingredients comprising preformed dimethylol urea and preformed polymethylol amidogentriazine in which the methylol group is attached directly to the nitrogen of the amidogen group.

4. A composition of matter comprising the resinous product of reaction of (1) a chlorinated acetamide and (2) a partial condensation product of ingredients comprising essentially preformed dimethylol urea and a preformed methylol amidogentriazine in which the methylol group is attached directly to the nitrogen of the amidogen group.

5. A composition of matter comprising the resinous product of reaction of (1) a chlorinated acetamide and (2) a partial condensation product of ingredients comprising essentially preformed dimethylol urea and a preformed methylol melamine.

6. A synthetic resinous composition comprising the product of reaction of (1) a chlorinated acetamide and (2) a partial condensation product of ingredients comprising (a) a preformed methylol amidogentriazine in which the methylol group is attached directly to the nitrogen of the amidogen group and (b) a preformed compound consisting of a urea containing at least two methylol groups attached directly to the nitrogen of the urea, said components of (2) being present in the ratio of one mol of the preformed methylol amidogentriazine of (a) to at least one mol of the preformed compound of (b).

7. A heat-curable composition comprising a heat-convertible resinous product of reaction of (1) a chlorinated acetamide and (2) a potentially reactive condensation product of ingredients comprising (a) a preformed poly-methylol amidogentriazine in which the methylol group is attached directly to the nitrogen of the amidogen group and (b) preformed dimethylol urea in the ratio of one mol of the compound of (a) to from 1 to 10 mols of the compound of (b).

8. A product comprising the heat-cured composition of claim 7.

9. The resinous reaction product of (1) a partial condensation product of ingredients comprising preformed poly-methylol melamine and preformed dimethylol urea in the ratio of one mol of the former to from 2 to 7 mols of the latter and (2) a chlorinated acetamide.

10. The resinous reaction product of (1) a partial condensation product of ingredients comprising preformed trimethylol melamine and preformed dimethylol urea in the ratio of one mol of the former to from 2 to 7 mols of the latter and (2) a chlorinated acetamide.

11. A composition comprising the resinous product of reaction of (1) a chlorinated acetamide with (2) an alkaline-catalyzed partial condensation product of ingredients comprising essentially (a) a preformed methylol amidogentriazine in which the methylol group is attached directly to the nitrogen of the amidogen group and (b) a preformed compound consisting of a urea containing at least two methylol groupings attached directly to the nitrogen of the urea.

12. A composition comprising the resinous product obtained by reaction of (1) a chlorinated acetamide and (2) a partial condensation product of ingredients comprising preformed trimethylol melamine and preformed dimethylol urea in the ratio of one mol of the former to from 2 to 7 mols of the latter and in the presence of a condensation catalyst comprising ammonia and a fixed alkali.

13. A product comprising the reaction product of (1) chloracetamide with (2) a potentially reactive resinous condensation product of preformed trimethylol melamine and preformed dimethylol urea in the ratio of one mol of the former to from 2 to 7 mols of the latter.

14. A heat-hardenable molding composition comprising a cellulosic filler and the heat-curable resinous product of reaction of (1) a chlorinated acetamide and (2) a potentially reactive condensation product of preformed poly-methylol melamine and preformed dimethylol urea in the ratio of one mol of the former to from 2 to 7 mols of the latter.

15. An article of manufacture comprising the heat-hardened molding composition of claim 14.

16. The method of preparing new synthetic compositions which comprises forming a partial condensation product of ingredients comprising essentially (1) a preformed methylol amidogentriazine in which the methylol group is attached directly to the nitrogen of the amidogen group and (2) a preformed compound consisting of a urea containing at least two methylol groupings attached directly to the nitrogen of the urea, and causing a chlorinated acetamide to intercondense with the said partial condensation product.

17. The method of preparing new compositions of matter which comprises forming a partial condensation product of ingredients comprising essentially preformed trimethylol melamine and preformed dimethylol urea in the presence of a condensation catalyst comprising ammonia and a fixed alkali, and completing the condensation reaction between the said ingredients in the presence of a curing reactant comprising chloracetamide.

GAETANO F. D'ALELIO.

CERTIFICATE OF CORRECTION.

Patent No. 2,328,425. August 31, 1943.

GAETANO F. D'ALELIO.

It is hereby certified that error appears in the printed specification of the above numbered patent requiring correction as follows: Page 4, first column, line 17, for "hydoxy" read --hydroxy--; line 38, for "carbamyl" read --amino--; line 39, for "amido" read --carbamyl--; and that the said Letters Patent should be read with this correction therein that the same may conform to the record of the case in the Patent Office.

Signed and sealed this 2nd day of November, A. D. 1943.

(Seal)

Henry Van Arsdale,
Acting Commissioner of Patents.